United States Patent
Neri et al.

(12)

(10) Patent No.: US 6,403,679 B1
(45) Date of Patent: Jun. 11, 2002

(54) GRANULAR FORM OF A MIXTURE OF A NICKEL-QUENCHER AND A BENZOPHENONE AND PROCESS FOR ITS PREPARATION

(75) Inventors: Carlo Neri, San Donato Milanese; Luciano Pallini, San Giuliano Milanese; Giovanni Sandre, San Donato Milanese, all of (IT)

(73) Assignee: Great Lakes Chemical (Europe) GmbH, Frauenfeld (CH)

( * ) Notice: Subject to any disclaimer, the term of this patent is extended or adjusted under 35 U.S.C. 154(b) by 0 days.

(21) Appl. No.: 09/622,045

(22) PCT Filed: Mar. 31, 1999

(86) PCT No.: PCT/EP99/02366

§ 371 (c)(1),
(2), (4) Date: Aug. 23, 2000

(87) PCT Pub. No.: WO99/52977

PCT Pub. Date: Oct. 21, 1999

(30) Foreign Application Priority Data

Apr. 9, 1998 (IT) .......................................... MI98A0752

(51) Int. Cl.[7] .............................. C08K 5/46; C08K 5/13

(52) U.S. Cl. ...................... 524/83; 524/328; 252/400 R; 252/402; 252/403

(58) Field of Search .............................. 252/400 R, 402, 252/403; 524/328, 83

(56) References Cited

U.S. PATENT DOCUMENTS 4,734,449 A * 3/1988 Gugumus .................... 524/328

FOREIGN PATENT DOCUMENTS

EP 0214507 * 3/1987
EP 0565184 * 10/1993

* cited by examiner

*Primary Examiner*—Kriellion A. Sanders
(74) *Attorney, Agent, or Firm*—Oblon, Spivak, McClelland, Maier & Neustadt, P.C.

(57) ABSTRACT

Granular form of a mixture comprising: (a) a nickel-quencher corresponding to [2,2'-thio-bis(4-t-octyl-phenolate)-n-butylamine Nickel (II)]; (b) a 2-hydroxy-4-alkyloxybenzophenone corresponding to 2-hydroxy-4-n-octyloxybenzophenone; characterized in that it has two diffraction lines at angles $2\theta=17.593$ and $2\theta=22.023$ in the X-Ray diffraction spectrum from powders. The above granular form can be used as a light stabilizer for agricultural films based on polyolefins or olefinic copolymers.

9 Claims, 4 Drawing Sheets

Figure 1:
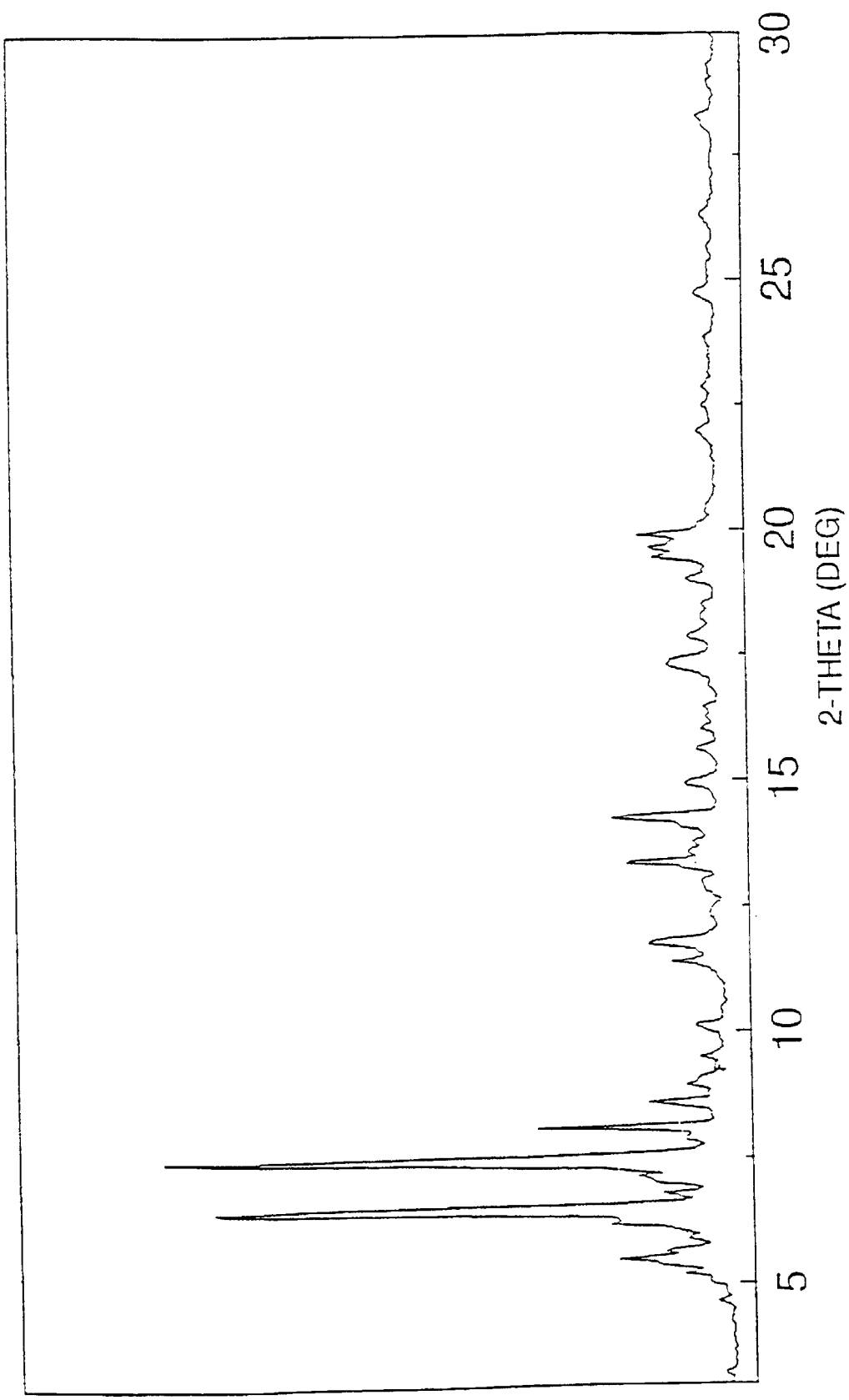

GRANULAR FORM OF A MIXTURE OF A NICKEL-QUENCHER AND A BENZOPHENONE AND PROCESS FOR ITS PREPARATION

The present invention relates to a granular form of a mixture of a nickel-quencher and a benzophenone.

More specifically, the present invention relates to a granular form of a mixture of a nickel-quencher and a 2-hydroxy-4-alkyloxybenzophenone, a process for its preparation and its use as a light stabilizer for agricultural films based on polyolefins or olefinic copolymers.

The present invention also relates to agricultural films based on polyolefins or olefinic copolymers stabilized with the above granular form and greenhouses covered with these films.

Nickel-quenchers are at present sold in fine powder form and their use causes problems of environmental pollution, health and the safety of the operators in the feeding and handling phase.

A benzophenone is also generally used in the stabilization of agricultural films, together with nickel-quenchers.

Conventional methods for obtaining a physical form of nickel-quencher with a low powder content (for example, compaction of the powders under pressure) tested on both the nickel-quencher alone, and on mixtures of nickel-quenchers and benzophenones, have proved to be inapplicable or have not given satisfactory results.

The Applicant has now found a granular form of a mixture of a nickel-quencher and a benzophenone capable of overcoming the drawbacks of the known art.

The present invention therefore relates to a granular form of a mixture comprising:

(a) a nickel-quencher corresponding to [2,2'-thio-bis(4-t-octyl-phenolate)-n-butylamineNickel (II)] having formula (I):

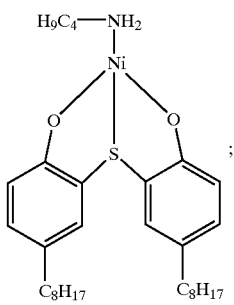

(I)

(b) a 2-hydroxy-4-alkyloxybenzophenone corresponding to 2-hydroxy-4-n-octyloxybenzophenone having formula (II):

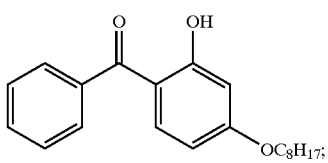

(II)

characterized in that it has two diffraction lines at angles 2θ=17.593 and 2θ=22.023 in the X-Ray diffraction spectrum from powders.

The X-Ray diffraction spectrum from powders is carried out using Cu-K$_\alpha$ radiation (λ=1.54178).

In the granular form of the present invention, the nickel-quencher (a) having formula (I) and the benzophenone (b) having formula (II) are used in a ratio ranging from 0.4 to 3, preferably in a ratio ranging from 1 to 2.

The nickel-quencher (a) having formula (I) is known under the following trade-names: Cyasorb UV 1084 of Cytec, or Chimassorb N-705 of Ciba.

The benzophenone (b) having formula (II) is known under the following trade-names: Lowilite 22 of Great Lakes, Chimassorb 81 of Ciba, or Cyasorb UV 531 of Cytec.

The granular form of the present invention can be obtained according to the following process.

A process for the preparation of the granular form of the present invention comprises:

(1) dissolving, under stirring, the nickel-quencher (a) having formula (I) in the benzophenone (b) having formula (II) which has been previously melted at 50° C.;

(2) cooling the solution obtained as described under point (1).

Step (1) of the above process is carried out at a different temperature depending on the ratio between the nickel-quencher (a) having formula (I) and the benzophenone (b) having formula (II), used: step (1) of the present invention is generally carried out at a temperature ranging from 50° C. to 150° C., preferably between 50° C. and 120° C.

The cooling according to step (2) of the above process, suitable for causing the solidification of the solution obtained as described in point (1), can be obtained with any of the methods known in the art.

The preferred methods consist in:

pouring the solution onto a cold metal plate maintained, for example, at a temperature equal to or less than room temperature: in this case the solid obtained must be granulated so as to obtain granules having the desired dimensions;

dripping the solution onto a cold metal plate maintained, for example, at a temperature equal to or less than room temperature: in this case drops are obtained already having the desired dimensions.

Figure 2:
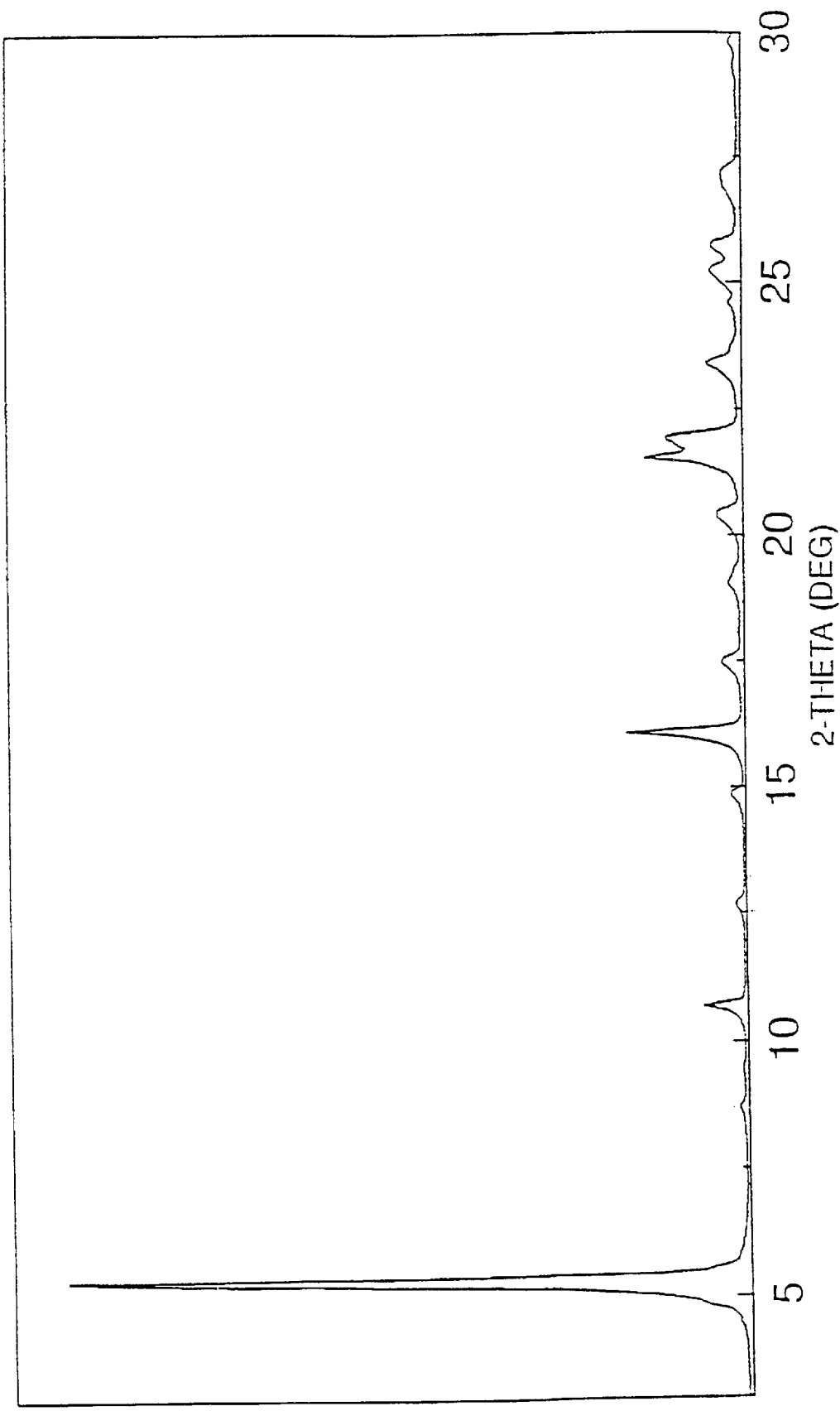
Figure 3:
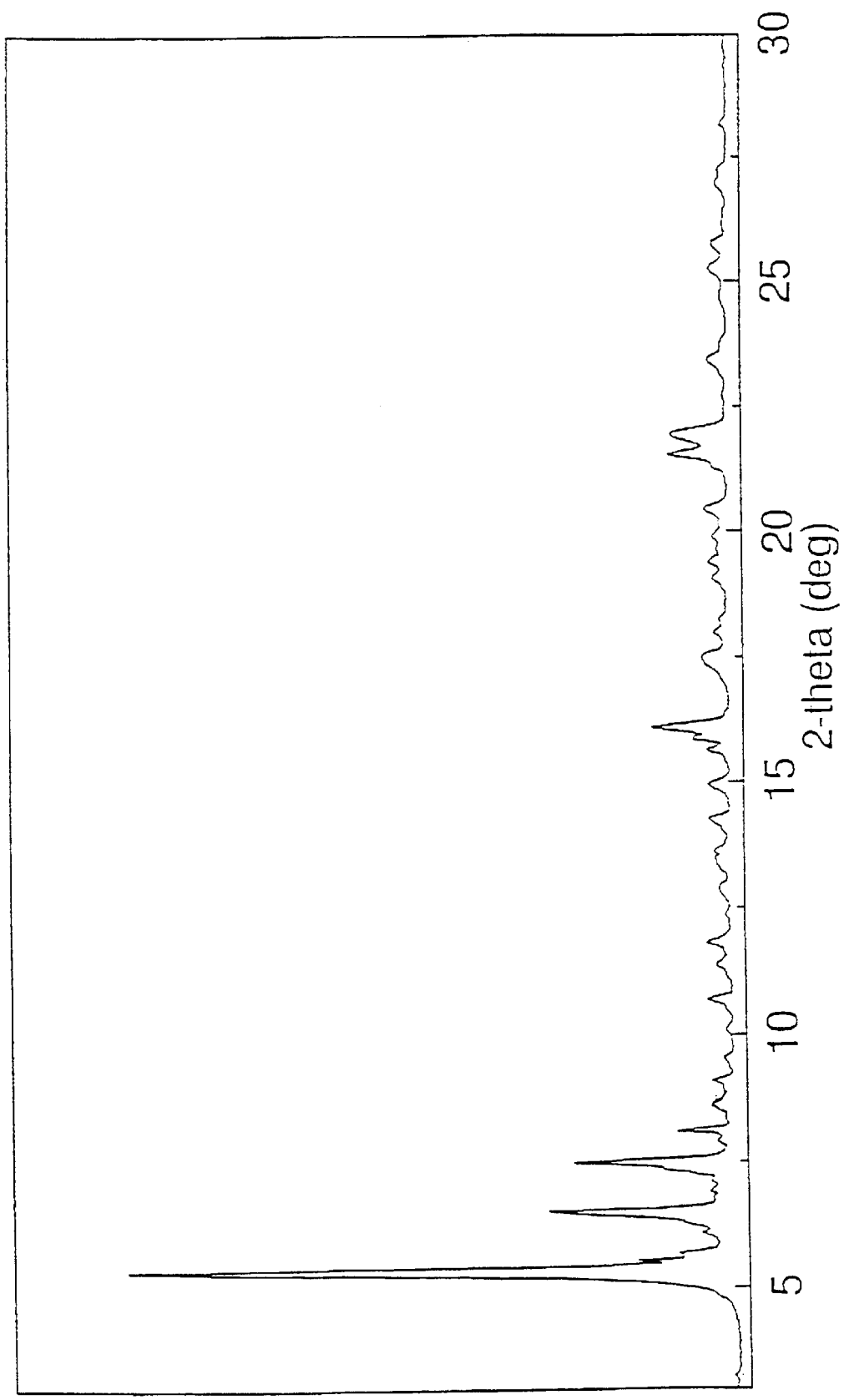
Figure 4:
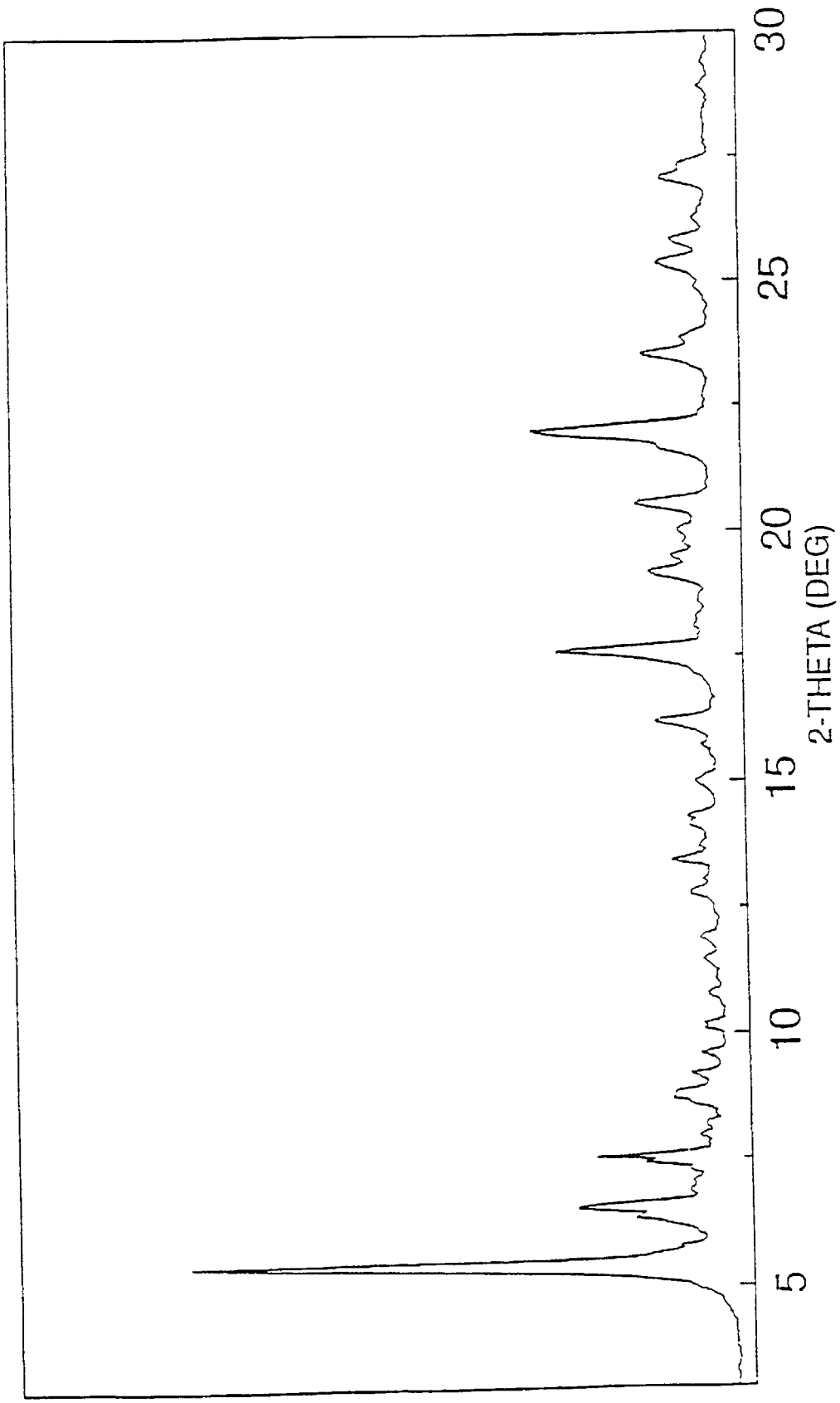

The nickel-quencher (a) and benzophenone (b) powders and the granules obtained as described above, are subjected to X-Ray diffraction and the spectra obtained are indicated in the following figures:

FIG. 1: X-Ray diffraction spectrum from powders of the nickel-quencher (a) in powder form;

FIG. 2: X-Ray diffraction spectrum from powders of benzophenone (b) in powder form;

FIG. 3: X-Ray diffraction spectrum from powders of the physical mixture of nickel-quencher (a) and benzophenone (b) powders;

FIG. 4: X-Ray diffraction spectrum from powders of the granules obtained, as described above, from the mixture of nickel-quencher (a) and benzophenone (b) powders.

As can be observed, FIG. 4 shows two diffraction lines at angles 2θ=17.593 and 2θ=22.023 in the X-Ray diffraction spectrum from powders which are not present in the X-Ray diffraction spectrum from powders of the nickel-quencher (a) and benzophenone (b) alone (FIG. 1 and 2) and their physical mixture (FIG. 3).

The granular form of the present invention has a melting range between 47° C. and 50° C., measured by Buchi Instrument (tube of 1 mm of diameter). As an additive having a low melting point generally has a shorter homogenization time in the polymer to which it is added, it is evident that, in addition to the advantage of overcoming the drawbacks of the known art described above, the granular form of the present invention also guarantees a more rapid homogenization of the additives inside the polymer. In addition, as the process for the preparation of the granular form of the present invention comprises, in step (a), a phase in which both compounds (a) and (b) are in the liquid state, there is also a perfectly homogeneous distribution of the two additives therein (for example, mechanical mixing of the two powders does not produce a mixture having the same degree of homogeneity).

As already mentioned above, the granular form of the present invention can be used as a light stabilizer for agricultural films based on polyolefins and olefinic copolymers.

Polyolefins and olefinic copolymers which can be used for the purpose are:

(1) polymers of mono-olefins and diolefins such as, for example, polypropylene, polyisobutylene, polybut-1-ene, poly-4-methylpent-1-ene, polyisoprene or polybutadiene; as well as polymers of cyclo-olefins such as, for example, cyclopentene or norbornene; polyethylene (which can be optionally cross-linked) such as, for example, high density polyethylene (HDPE), low density polyethylene (LDPE), linear low density polyethylene (LLDPE), branched low density polyethylene (BLDPE).

Polyolefins such as, for example the mono-olefins mentioned in the above paragraph, preferably polyethylene and polypropylene, can be prepared with various methods known in literature, preferably using the following methods:

(a) radicalic polymerization (generally carried out at a high pressure and high temperature);

(b) catalytic polymerization using a catalyst which normally contains one or more metals of groups IVb, Vb, VIb or VIII of the Periodic Table. These metals generally have one or more ligands such as, for example, oxides, halides, alcoholates, ethers, amines, alkyls, alkenyls and/or aryls which can be π- or σ-co-ordinated. These metal complexes can be in free form or supported on substrates such as, for example activated magnesium chloride, titanium(III) chloride, alumina or silicon oxide. These catalysts can be soluble or insoluble in the polymerization medium. The catalysts can be used alone or in the presence of other activators such as, for example, metal alkyls, metal hydrides, halides of metal alkyls, oxides of metal alkyls or metal alkyloxanes, these metals being elements belonging to groups Ia, IIa and/or IIIa of the Periodic Table. The activators can be conveniently modified with other ester, ether, amine or silyl-ether groups. These catalytic systems are usually called Phillips, Standard Oil Indiana, Ziegler (-Natta), TNZ (Du-Pont), metallocene or "single site catalyst" (SSC).

(2) Mixtures of the polymers described under point (1) such as, for example, mixtures of polypropylene with polyisobutylene; mixtures of polypropylene with polyethylene (for example, PP/HDPE, PP/LDPE); mixtures of different types of polyethylene (for example, LDPE/HDPE).

(3) Copolymers of mono-olefins and diolefins with each other or with other vinyl monomers such as, for example, ethylene-propylene copolymers, linear low density polyethylene (LLDPE) and its mixtures with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, propylene/butadiene copolymers, isobutylene/isoprene copolymers, ethylene/alkyl acrylate copolymers, ethylene/alkyl methacrylate copolymers, ethylene/vinyl acetate copolymers and their copolymers with carbon monoxide or ethylene/acrylic acid copolymers and their salts (ionomers) as well as terpolymers of ethylene with polypropylene and a diene such as, for example, hexadiene, dicyclopentadiene or ethylidene-norbornene; and mixtures of these copolymers with each other or with the polymers cited in paragraph (1) such as, for example, polypropylene/ethylene-propylene copolymers, LDPE/ethylene-vinylacetate (EVA) copolymers, LDPE/ethylene-acrylic acid (EAA) copolymers, LLDPE/EVA, LLDPE/EAA, and alternating or random polyalkylene/carbon monoxide copolymers and their mixtures with other polymers such as, for example, polyamides.

Preferred for the purpose are polymers of mono-olefins, preferably α-mono-olefins such as, for example, polypropylene, polyisobutylene, polybut-1-ene, poly-4-methylpent-1-ene, as well as polymers of cyclo-olefins, polyethylene (which can be optionally cross-linked) such as, for example, high density polyethylene (HDPE), low density polyethylene (LDPE), linear low density polyethylene (LLDPE), branched low density polyethylene (BLDPE) and copolymers of these monomers with vinyl acetate. Even more preferred are polyethylene, ethylene/propylene copolymer, ethylene/vinyl acetate copolymer and polypropylene, in particular polyethylene, preferably low density polyethylene (LDPE).

A further object of the present invention relates to agricultural films based on polyolefins or olefinic copolymers containing an effective quantity of the granular form described above.

The granular form of the present invention can be used as such or combined with other stabilizers, in the above polymeric agricultural films.

The granular form of the present invention is generally used in a quantity ranging from about 0.1% to about 2% with respect to the weight of the films to be stabilized, preferably between about 0.2% and about 1%.

The granular form of the present invention, optionally in the presence of other additives, can be easily incorporated into the polymers to be stabilized using the conventional techniques.

The resulting polymeric compositions can be transformed into films operating according to the conventional techniques.

The above films based on polyolefins or olefinic copolymers, can contain metal oxides or hydroxides such as, for example, oxides of zinc, aluminum, calcium or magnesium, or hydroxides of zinc, aluminum or calcium, preferably zinc oxide (ZnO), zinc hydroxide [$Zn(OH)_2$], aluminum ortho- or meta-hydroxide [$Al(OH)_3$], aluminum α- or γ-oxide, magnesium oxide (MgO) Zinc oxides or hydroxides are preferred, zinc oxide is even more preferred.

The above metal oxides or hydroxides are generally added in a quantity ranging from 0.005% to 3% by weight with respect to the weight of the films to be stabilized, preferably between 0.005% and 1% by weight, even more preferably between 0.025% and 0.5% by weight.

In many cases, the above films contain a salt of a $C_1$–$C_{30}$ carboxylic acid, preferably a salt of a $C_8$–$C_{22}$ carboxylic acid, even more preferably a salt of a $C_8$–$C_{18}$ carboxylic acid.

Preferred films are those which contain one or more components selected from salts of earth-alkaline metals, zinc salts and aluminum salts of a $C_1$–$C_{30}$ carboxylic acid, hydrotalcites, and sterically hindered amines.

Films based on polyolefins or olefinic copolymers containing salts of a $C_1$–$C_{30}$ carboxylic acid are of greatest interest for the purpose. Metal carboxylates which can be optionally added are, mainly, salts of Al, Ba, Ca, Mg, Sr or Zn. Salts of Al, Ca, Mg or Zn, especially of $C_{12}$–$C_{18}$ carboxylic acids, are preferred. Calcium salts such as, for example, calcium stearate, are even more preferred.

The metal carboxylates are used in a quantity ranging from 0.05% to 2% by weight with respect to the weight of the films to be stabilized, preferably between 0.1% and 1% by weight.

The sterically hindered amines are added in a quantity ranging from about 0.01% to 5% by weight with respect to the weight of the films to be stabilized, preferably between 0.025% and 2% by weight, even more preferably between 0.05% and 1% by weight.

The films described above may advantageously contain a hydrotalcite. Hydrotalcites which can be used for the purpose are selected from those having the following general formula (III):

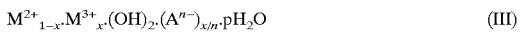

$$M^{2+}{}_{1-x}\cdot M^{3+}{}_x\cdot(OH)_2\cdot(A^{n-})_{x/n}\cdot pH_2O \qquad (III)$$

wherein:

$M^{2+}$ is Mg, Ca, Sr, Ba, Zn, Pb, Sn and/or Ni;

$M^{3+}$ is Al, B or Bi;

$A^{n-}$ is an anion of the valency n;

n is a number between 1 and 4 extremes included;

x is a number between 0 and 0.5 extremes included;

p is a number between 0 and 2 extremes included;

A is $OH^-$, $Cl^-$, $Br^-$, $I^-$, $ClO_4^-$, $HCO_3^-$, $CH_3COO^-$, $C_6H_5COO^-$, $CO_3^{2-}$, $SO_4^{2-}$, $(COO)_2^{2-}$, $(CHO\ HCOO)_2^{2-}$, $(CHOH)_4CH_2OHCOO^-$, $C_2H_4(COO)_2^{2-}$, $(CH_2COO)_2^{2-}$, $CH_3CHOHCOO^-$, $SiO_3^{2-}$, $SiO_4^{4-}$, $Fe(CN)_6^{3-}$, $Fe(CN)_6^{4-}$, $BO_3^{3-}$, $PO_3^{3-}$ or $HPO^{42-}$.

Preferred hydrotalcites having general formula (III) are those wherein $M^{2+}$ is $Ca^{2+}$, $Mg^{2+}$ or a mixture of $Mg^{2+}$ and $Zn^{2+}$, $A^{n-}$ is $CO_3^{2-}$, $BO_3^{3-}$ or $PO_3^{3-}$, x is a number between 0 and 0.5 extremes included and p is a number between 0 and 2 extremes included.

Other hydrotalcites which can be advantageously used are those having general formula (IIIa):

$$M_x^{2+}Al_2(OH)_{2x+6nz}(A^{n-})_2\cdot pH_2O \qquad (IIIa)$$

wherein:

$M^{2+}$ is Mg or Zn, preferably Mg;

$A^{n-}$ is an anion selected from $CO_3^{2-}$, $(COO)_2^{2-}$, $OH^-$ and $S^{2-}$, wherein n is the valency of the anion.

p is a positive number, preferably between 0 and 5 extremes included, for example between 0.5 and 5 extremes included;

x is a positive number preferably between 2 and 6 extremes included;

z is a positive number less than 2.

Preferred hydrotalcites having general formula (IIIa) are those represented by the following formulae (IIIb)–(IIIh):

$$Al_2O_3\cdot 6MgO\cdot CO_2\cdot 12H_2O \qquad (IIIb);$$

$$Mg_{4.5}Al_2(OH)_{13}\cdot CO_3\cdot 3.5H_2O \qquad (IIIc);$$

$$4MgO\cdot Al_2O_3\cdot CO_2\cdot 9H_2O \qquad (IIId);$$

$$4MgO\cdot Al_2O_3\cdot CO_2\cdot 6H_2O \qquad (IIIe);$$

$$ZnO\cdot 3MgO\cdot Al_2O_3\cdot CO_2\cdot 8\text{–}9H_2O \qquad (IIIf);$$

$$ZnO\cdot 3MgO\cdot Al_2O_3\cdot CO_2\cdot 5\text{–}6H_2O \qquad (IIIg);$$

$$Mg_{4.5}Al_2(OH)_{13}\cdot CO_3 \qquad (IIIh).$$

Hydrotalcites can be advantageously used in a quantity ranging from 0.01% to 5% by weight with respect to the weight of the films to be stabilized, preferably between 0.2% and 3% by weight.

Useful sterically hindered amines which can be added to the films described above, can be single compounds or mixtures of compounds. In the case of mixtures, the quantities indicated above refer to the total quantity of sterically hindered amines used.

Sterically hindered amines refer to compounds containing one or more trivalent groups having general formula (IV):

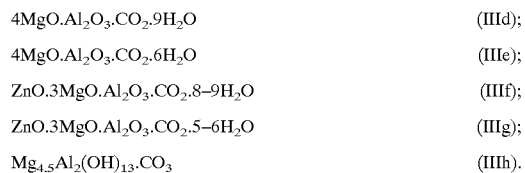

wherein G is hydrogen or methyl and not more than one of the free valencies in the above general formula (IV) is saturated with a hydrogen and 2 or 3 of the free valencies represent bonds with carbon atoms or hetero-atoms.

Examples of the above sterically hindered amines are described, for example, in U.S. Pat. Nos. 4,086,204, 4,108,829, 4,263,434, 4,233,412, 4,288,593, 4,315,859, 4,321,374, 4,331,586, 4,413,093, 4,435,555, 4,477,615, 4,335,242, 4,376,836, 4,433,145, 4,459,395, 4,477,615, 4,533,688, 4,540,728, 4,547,548 and 4,740,544; in European patent applications EP 22,080, EP 29,522, EP 24,338, EP 42,554, EP 44,499, EP 70,386, EP 72,009, EP 75,849, EP 82,244, EP 94,048, EP 107,615, EP 402,889 and EP 357,223; and in German patent application DE 3,530,666; the texts of the above documents should be considered as forming an integrant part of the present description.

In many cases, the sterically hindered amines are cyclic, in particular they are compounds selected from polyalkylpiperidine derivatives containing at least one group having general formula (V):

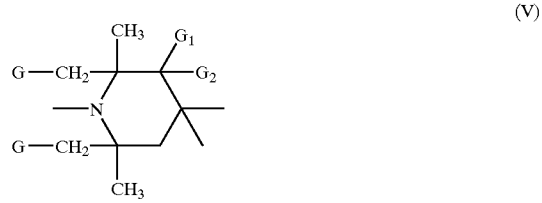

wherein G is hydrogen or methyl, and $G_1$ and $G_2$ are hydrogen, methyl or, together, they are a substituent=0; the polyalkylpiperidine groups having general formula (V) are generally substituted in position 4 by one or two polar substituents or by a polar ring having a spiro structure.

Of particular importance are cyclic stearically hindered amines containing at least one group having genera formula (V) where G is hydrogen and $G_1$ and $G_2$ are hydrogen or, together, are substituent=0.

In particular, derivatives of 2,2,6,6-tetramethylpiperidine are advantageously used.

Of particular importance is the use of compounds belonging to the group of polyalkylpiperidine carrying at least one group having general formula (V) in the molecule, selected from those listed below under points (a)–(i).

(a) Compounds having general Formula (VI):

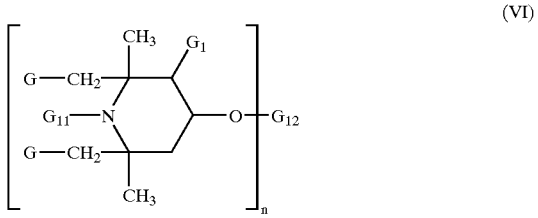

Wherein n is a number between 1 and 4 extremes included; G and $G_1$ are, each independently, hydrogen or methyl; $G_{11}$ is hydrogen, a $C_1$–$C_{18}$ alkyl group, a $C_3$–$C_8$ alkenyl group, a $C_3$–$C_8$ alkinyl group, a $C_{17}$–$C_{12}$ aralalkyl group, a $C_1$–$C_8$ alkanoyl group, a $C_3$–$C_5$ alkenoyl group, a glycidyl group, a —$CH_2CH(OH)$—Z group wherein Z is hydrogen, methyl, or phenyl, $G_{11}$ preferably being hydrogen, a $C_1$–$C_4$ alkyl group, an allyl, a benzyl, an acetyl or an acryloyl; $G_{12}$, when n is 1, is hydrogen, a $C_1$–$C_{18}$ alkyl group which can be interrupted by one or more oxygen atoms, a cyanoethyl group, a benzyl, a glycidyl group, a monovalent radical of a carboxylic acid, of a carbamic acid or of an acid containing phosphorous, aliphatic, cycloaliphatic or araliphatic, unsatured or aromatic, or a monovalent silyl radical, preferably a radical of an aliphatic carboxylic acid having from 2 to 18 carbon atoms, of a cycloaliphatic carboxylic acid having from 7 to 15 carbon atoms, of an α,β-unsaturated carboxylic acid having from 3 to 5 carbon atoms, of an aromatic carboxylic acid having from 7 to 15 carbon atoms, said carboxylic acids optionally substituted in the aliphatic, cycloaliphatic or aromatic part with 1–3 —$COOZ_{12}$ groups wherein $Z_{12}$ is hydrogen, a $C_1$–$C_{20}$ alkyl group, a $C_3$–$C_{12}$ alkenyl group, a $C_5$–$C_7$ cycloalkyl group, a phenyl or a benzyl; $G_{12}$, when n is 2, is a $C_2$–$C_{12}$ alkylene group, a $C_4$–$C_{12}$ alkenyienic group, a xylylene group, a divalent radical of a dicarboxylic acid, of a dicarbamic acid or of an acid containingphosphorous, aliphatic, cycloaliphatic, araliphatic or aromatic, or a divalent silyl radical, preferably a radical of an aliphatic dicarboxylic acid having from 2 to 36 carbon atoms, of a cycloaliphatic or aromatic dicarboxylic acid having from 8 to 14 carbon atoms, of an aliphatic, cycloaliphatic or aromatic dicarbamic acid having from 8 to 14 carbon atoms, said dicarboxylic acids optionally substituted in the aliphatic, cycloaliphatic or aromatic part, with 1 or 2 —$COOZ_{12}$ groups wherein $Z_{12}$ has the same meanings described above; $G_{12}$, when n is 3, is a trivalent radical of an aliphatic, cycloaliphatic or aromatic tricarboxylic acid, optionally substituted in the aliphatic, cycloaliphatic or aromatic part, with a —$COOZ_{12}$ group wherein $Z_{12}$ has the same meanings described above, or of an aromatic tricarbamic acid or of an acid containing phosphorous, or it is a trivalent silyl radical; $G_{12}$, when n is 4, is a tetravalent radical of an aliphatic, cycloaliphatic or aromatic tetracarboxylic acid.

Radicals of tetracarboxylic acids comprise, in any case, radicals having the formula (—$CO)_nR$ wherein n has the same meaning defined above and R can be easily deduced from the definition described above.

Examples of $C_1$–$C_{12}$ alkyl groups are: methyl, ethyl, n-propyl, n-butyl, sec-butyl, t-butyl, n-hexyl, n-octyl, 2-ethylhexyl, n-nonyl, n-decyl, n-undecyl, n-dodecyl, etc.

Examples of $G_{11}$ and $G_{12}$ substituents, when they are a $C_1$–C18 alkyl group, are, in addition to the groups described above: n-tridecyl, n-tetradecyl, n-hexadecyl, n-octadecyl, etc.

Examples of the substituent $G_{11}$, when it is a $C_3$–$C_8$ alkenyl group, are: 1-propenyl, allyl, methallyl, 2-butenyl, 2-pentenyl, 2-hexenyl, 2-octenyl, 4-t-butyl-2-butenyl, etc.

When the substituent $G_{11}$ is a $C_3$–$C_8$ alkinyl group, it is preferably propargyl.

When the substituent $G_{11}$ is a $C_7$–$C_{12}$ aralalkyl group, it is in particular phenethyl, preferably benzyl.

Examples of the substituent $G_{11}$, when it is a $C_1$–$C_8$ alkanoyl group, are: formyl, propionyl, butyryl, octanoyl, preferably acetyl and, when it is a $C_3$–$C_5$ alkenoyl group, preferably acryloyl.

Examples of the substituent $G_{12}$, when it is a monovalent radical of a carboxylic acid, are radicals of the following acids: acetic, caproic, stearic, acrylic, methacrylic, benzoic, β-(3,5-di-tert-butyl-4-hydroxyphenyl)propionic, etc.

Examples of the substituent $G_{12}$, when it is a monovalent silyl radical, are: a radical having the general formula —$(C_jH_{2j})$—$Si(Z')_2Z''$ wherein j is an integer between 2 and 5 extremes included, and Z' and Z" are, each independently, a $C_1$–$C_4$ alkyl group or a $C_1$–$C_4$ alkoxyl group.

Examples of the substituent $G_{12}$, when it is a divalent radical of a dicarboxylic acid, are radicals of the following acids: malonic, succinic, glutaric, adipic, suberic, sebacic, maleic, itaconic, phthalic, dibutylmalonic, dibenzylmalonic, butyl(3,5-di-tert-butyl-4-hydroxybenzyl)malonic, bicycloheptenedicarboxylic, etc.

Examples of the substituent $G_{12}$, when it is a trivalent radical of a tricarboxylic acid, are radicals of the following acids: trimellitic, citric, nitrilotriacetic, etc.

Examples of the substituent $G_{12}$, when it is a tetravalent radical of a tetracarboxylic acid, are radicals of the following acids: butane-1,2,3,4-tetracarboxylic, pyromellitic, etc.

Examples of the substituent $G_{12}$, when it is a divalent radical of a dicarbamic acid, are radicals of the following acids: hexamethylenedicarbamic, 2,4-toluylenedicarbamic, etc.

Compounds having general formula (VI) are preferred, wherein G is hydrogen, $G_{11}$ is hydrogen or methyl, n is 2 and $G_{12}$ is a diacyl radical of an aliphatic dicarboxylic acid having from 4 to 12 carbon atoms.

Specific examples of polyalkylpiperidines having general formula (VI) are:

1) 4-hydroxy-2,2,6,6-tetramethylpiperidine;
2) 1-allyl-4-hydroxy-2,2,6,6-tetramethylpiperidine;
3) 1-benzyl-4-hydroxy-2,2,6,6-tetramethylpiperidine;
4) 1-(4-t-butyl-2-butenyl)-4-hydroxy-2,2,6,6-tetramethylpiperidine;
5) 4-stearyloxy-2,2,6,6-tetramethylpiperidine;
6) 1-ethyl-4-salicyloyloxy-2,2,6,6-tetramethylpiperidine;
7) 4-methacryloyloxy-1,2,2,6,6,-pentamethylpiperidine;
8) 1,2,2,6,6-pentamethylpiperidin-4-yl-β-(3,5-di-t-butyl-4-hydroxyphenyl)propionate;
9) di(1-benzyl-2,2,6,6-tetramethylpiperidin-4-yl)maleate;
10) di(2,2,6,6-tetramethylpiperidin-4-yl)succinate;
11) di(2,2,6,6-tetramethylpiperidin-4-yl)glutarate;
12) di(2,2,6,6-tetramethylpiperidin-4-yl)adipate;

13) di(2,2,6,6-tetramethylpiperidin-4-yl)sebacate;

14) di(1,2,2,6,6-pentamethylpiperidin-4-yl)sebacate;

15) di (1,2,3,6-tetramethyl-2,6-diethylpiperidin-4-yl) sebacate;

16) di(1-alyl-2,2,6,6-tetramethylpiperidin-4-yl)phthalate;

17) (1-acetyl-2,2,6,6-teramethylpiperidin-4-yl)acetate;

18) ester of tri(2,2,6,6-tetramethylpiperidin-4-yl) trimellitic acid;

19) 1-acryloyl-4-benzyloxy-2,2,6,6-tetramethylpiperidine;

20) di(2,2,6,6-tetramethylpiperidin-4-yl)diethylmalonate;

21) di(1,2,2,6,6-pentamethylpiperidin-4-yl) dibutylmalonate;

22) di(1,2,2,6,6-pentamethylpiperidin-4-yl)butyl-(3,5-di-tert-butyl-4-hydroxybenzyl)malonate;

23) hexane-1',6'-bis(4-carbamoyloxy-1-n-butyl-2,2,6,6-tetramethylpiperidine;

24) toluene-2',4'-bis(4-carbamoyloxy-1-n-propyl-2,2,-6,6-tetramethylpiperidine;

25) dimethyl-bis(2,2,6,6-tetramethylpiperidin-4-oxy)silane;

26) phenyl-tris(2,2,6,6-tetramethylpiperidin-4-oxy)silane;

27) tris(1-propyl-2,2,6,6-tetramethylpiperidin-4-yl) phosphite;

28) tris(1-propyl-2,2,6,6-tetramethylpiperidin-4-yl) phosphate;

29) bis(1,2,2,6,6-pentamethylpiperidin-4-yl) phenylphosphonate;

30) 4-hydroxy-1,2,2,6,6,-pentamethylpiperidine;

31) 4-hydroxy-N-hydroxyethyl-2,2,6,6,-tetramethylpiperidine;

32) 4-hydroxy-N-(2-hydroxypropyl)-2,2,6,6-tetramethylpiperidine;

33) 1-glycidyl-4-hydroxy-2,2,6,6-tetramethylpiperidine.

(b) Compounds having general formula (VII):

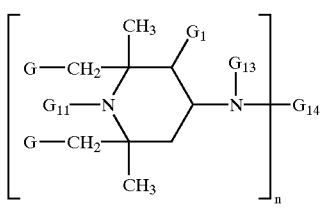

(VII)

wherein n is 1 or 2; G, $G_1$ and $G_{11}$ have the same meanings defined under point (a); $G_{13}$ is hydrogen, a $C_1$–$C_{12}$ alkyl group, a $C_2$–$C_5$ hydroxyalkyl group, a $C_5$–$C_7$ cycloalkyl group, a $C_7$–$C_8$ aralalkyl group, a $C_2$–$C_{18}$ alkanoyl group, a $C_3$–$C_5$ alkenoyl group, a benzoyl group, or a group having the following general formula:

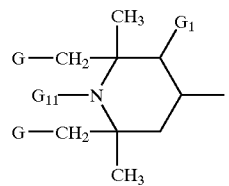

wherein G, $G_1$ and $G_{11}$ have the same meanings defined under point (a); $G_{14}$, when n is 1, is hydrogen, a $C_{1-C18}$ alkyl group, a $C_3$–$C_8$ alkenyl group, a $C_5$–$C_7$ cycloalkyl group, a $C_1$–$C_4$ alkyl group substituted with a hydroxyl group, with a cyano group, with an alkoxycarbonyl group or with a carbamide group, a glycidyl group, a group having the formula —$CH_2$—CH(OH)—Z or having the formula —CONH—Z wherein Z is hydrogen, methyl or phenyl;

$G_{14}$, when n is 2, is a $C_2$–$C_{12}$ alkylene group, a $C_6$–$C_{12}$ arylene group, a xylylene group, a group having the formula —$CH_2$—CH(OH)—$CH_2$— or having the formula —$CH_2$—CH(OH)—$CH_2$—O—D—O— wherein D is a $C_2$–$C_{10}$ alkylene group, a $C_6$–$C_{15}$ arylene group, a $C_6$–$C_{12}$ cycloalkylene group; or, on the condition that $G_{13}$ is not an alkanoyl group, an alkenoyl group or a benzoyl group, $G_{14}$ can also be a 1-oxo-($C_2$–$C_{12}$)-alkylene group, a divalent radical of a dicarboxylic acid or of a dicarbamic acid, aliphatic, cycloaliphatic or aromatic, or also a —CO— group;

or, when n is 1, $G_{13}$ and $G_{14}$ together can also be a divalent radical of a 1,2- or 1,3-dicarboxylic acid, aliphatic, cycloaliphatic or aromatic.

The term aryl refers to an aromatic hydrocarbon such as, for example, phenyl or naphthyl. The term aralkyl refers to an alkyl substituted with an aromatic hydrocarbon, for example, a hydrocarbon having from 6 to 10 carbon atoms; examples of aralkyls are benzyl, α-methylbenzyl, etc.

$C_1$–$C_{12}$ alkyl or $C_1$–C18 alkyl groups have already been defined under point (a).

$C_5$–$C_7$ cycloalkyl groups are, preferably, cyclohexyl.

When $G_{13}$ is a $C_7$–$C_8$ aralkyl group, it is phenylethyl, preferably benzyl.

When $G_{13}$ is a $C_2$–$C_5$ hydroxyalkyl group, it is 2-hydroxyethyl, 2-hydroxypropyl, etc.

Examples of $G_{13}$, when it is a $C_2$–$C_{18}$ alkanoyl group, are: propionyl, butyryl, octanoyl, dodecanoyl, hexadecanoyl, octadecanoyl, etc., preferably acetyl and, when it is a $C_3$–$C_5$ alkenoyl group, preferably acryloyl.

Examples of $G_{14}$, when it is a $C_2$–$C_8$ alkenyl group, are: allyl, methallyl, 2-butenyl, 2-pentenyl, 2-hexen-yl, 2-octenyl, etc.

Examples of $G_{14}$, when it is a $C_1$–$C_4$ alkyl group substituted by a hydroxyl, cyano, alkoxycarbonyl or carbamide group, are: 2-hydroxyethyl, 2-hydroxypropyl, 2-cyanoethyl, methoxycarbonylmethyl, 2-ethoxycarbonyl-ethyl, 2-aminocarbonylpropyl, 2-(dimethylaminocarbonyl)ethyl, etc.

Examples of $C_2$–$C_{12}$ alkylene groups are: ethylene, propylene, 2,2-dimethylpropylene, tetramethylene, hexamethylene, octamethylene, decamethylene, dodecamethylene, etc.

Examples of $C_6$–$C_1$ arylene groups are: o- m- or p-phenylene, 1,4-naphthylene, 4,4'-diphenylene, etc.

Examples of $C_6$–$C_{12}$ cycloalkylene groups are, preferably, cyclohexylene.

Preferred compounds having general formula (VIII) are those wherein n is 1 or 2, G is hydrogen, $G_{11}$ is hydrogen or methyl, $G_{13}$ is hydrogen, a $C_1$–$C_{12}$ alkyl group or a group having the formula:

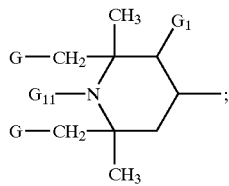

and $G_{14}$, when n is 1, is hydrogen or a $C_1$–$C_{12}$ alkyl group and, when n is 2, is a $C_2$–$C_8$ alkylene group or a 1-oxo-$C_2$–$C_8$ alkylene group.

Specific examples of polyalkylpiperidines having general formula (VII) are:

1) N,N'-bis (2,2,6,6-tetramethylpiperidin-4-yl) hexamethylene-1,6-diamine;

2) N,N'-bis(2,2,6,6-tetramethylpiperidin-4-yl) hexamethylene-1,6-diacetamide;

3) Bis (2,2,6,6-tetramethylpiperidin-4-yl)amine;

4) 4-benzoylamino-2,2,6,6-tetramethylpiperidine;

5) N,N'-bis(2,2,6,6-tetramethylpiperidin-4-yl)-N,N'-dibutyladipamide;

6) N,N'-bis(2,2,6,6-tetramethylpiperidin-4-yl)-N,N'-dicyclohexyl-2-hydroxypropylene-1,3-diamine;

7) N,N'-bis(2,2,6,6-tetramethylpiperidin-4-yl)-p-xylylenediamine;

8) N,N'-bis(2,2,6,6-tetramethylpiperidin-4-yl) succinediamide;

9) Bis(2,2,6,6-tetramethylpiperidin-4-yl)-N-(2,2,6,6-tetramethylpiperidin-4-yl)-β-aminodipropionate;

10) Compounds having the formula:

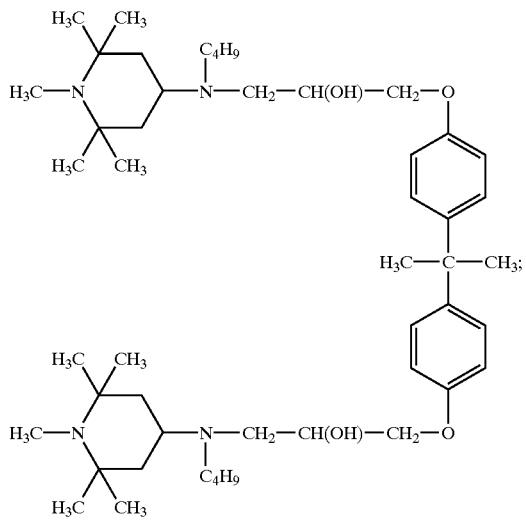

11) 4-[bis(2-hydroxyethyl)amino]-1,2,2,6,6-pentamethylpiperidine;

12) 4-(3-methyl-4-hydroxy-5-tert-butylbenzamido)-2,2,6,6-tetramethylpiperidine;

13) 4-methacrylamido-1,2,2,6,6-pentamethylpiperidine.

c) Compounds having general formula (VIII):

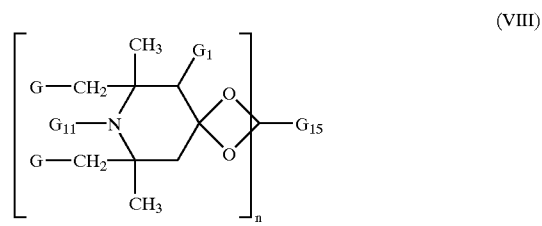

wherein n is 1 or 2; G, $G_1$ and $G_{11}$ have the same meanings described under point (a); $G_{15}$, when n is 1, is a $C_2$–$C_8$ alkylene or hydroxyalkylene group, or a $C_4$–$C_{22}$ acyloxyalkylene group, and, when n is 2, is a (—$CH_2$)$_2$C($CH_2$—)$_2$ group.

Examples of $G_{15}$ when it is a $C_2$–$C_8$ alkylene or hydroxyalkylene group, are: ethylene, 1-methylethylene, propylene, 2-ethylpropylene, 2-ethyl-2-hydroxymethyl-propylene, etc.

An example of $G_{15}$, when it is a $C_4$–$C_{22}$ acyloxyalkylene group is 2-ethyl-2-acetoxymethylpropylene.

Specific examples of polyalkylpiperidines having general formula (VIII) are:

1) 9-aza-8,8,10,10-tetramethyl-1,5-dioxaspiro[5.5]undecane;

2) 9-aza-8,8,10,10-tetramethyl-3-ethyl-1,5-dioxa-spiro[5.5]undecane;

3) 8-aza-2,7,7,8,9,9-hexamethyl-1,4-dioxaspiro[4.5]-decane;

4) 9-aza-3-hydroxymethyl-3-ethyl- 8,8,9,10,10-pentamethyl-1,5-dioxaspiro[5.5]undecane;

5) 9-aza-3-ethyl-acetoxymethyl-9-acetyl-8,8,10,10-tetramethyl-1,5-dioxaspiro[5.5]undecane;

6) 2,2,6,6-tetramethylpiperidine-4-spiro-2'-(1',3'-dioxane)-5'-spiro-5"-(1",3"-dioxane)-2"-spiro-4'''-(2''',2''',6''',6'''-tetramethylpiperidine).

d) Compounds having general formula (IXA), (IXB) and (IXC), the compounds having general formula (IXC) being preferred:

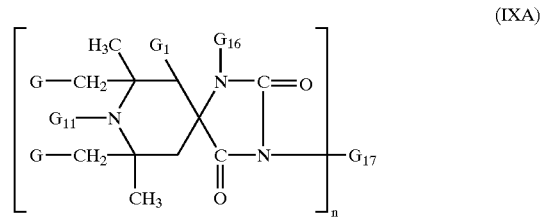

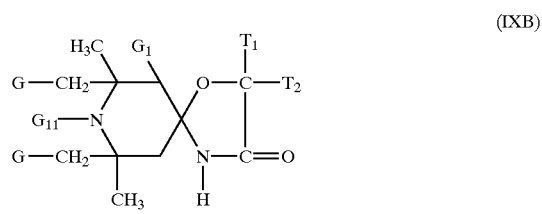

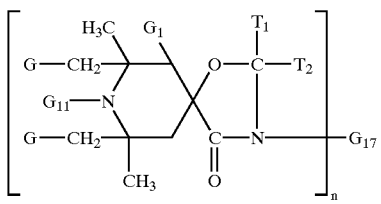

(IXC)

wherein n is 1 or 2, G, $G_1$ and $G_{11}$ have the same meanings described under point (a) ; $G_{16}$ is hydrogen, a $C_1-C_{12}$ alkyl group, an allyl group, a benzyl, a glycidyl group or a $C_2$-6 alkoxyalkyl group;

$G_{17}$, when n is 1, is hydrogen, a $C_1-C_{12}$ alkyl group, a $C_3-C_5$ alkenyl group, a $C_7C_9$ aralalkyl group, a $C_5-C_7$ cycloalkyl group, a $C_2-C_4$ hydroxyalkyl group, a $C_2-C_6$ alkoxyalkyl group, a $C_6-C_{10}$ aryl group, a glycidyl group, or a group having the formula —$(CH_2)_p$—COO—Q or —$(CH_2)_p$—O—CO—Q wherein p is 1 or 2 and Q is a $C_1-C_4$ alkyl group or a phenyl; $G_{17}$, when n is 2, is a $C_2-C_{12}$ alkylene group, a $C_4-C_{12}$ alkenylene group, a $C_6-C_{12}$ arylene group, a group having the formula —$CH_2$—CH(OH)—$CH_2$—O—D—O—$CH_2$—CH (OH)—$CH_2$— wherein D is a $C_2-C_{10}$ alkylene group, a $C_6-C_{15}$ arylene group, a $C_6-C_{12}$ cycloalkylene group, or a group having the formula —$CH_2CH(OZ')CH_2$—($OCH_2$—CH(OZ')$CH_2$)_2 wherein Z' is hydrogen, a $C_1-C_{18}$ alkyl group, an allyl, a benzyl, a $C_2-C_{12}$ alkanoyl group or a benzoyl; $T_1$ and $T_2$ are, each independently, a $C_1-C_{18}$ alkyl group, a $C_6-C_{10}$ aryl group, a $C_7-C_9$ aralalkyl group, said groups optionally substituted with a halogen atom or with a $C_1-C_4$ alkyl group; or $T_1$ and $T_2$, considered jointly with the carbon atom to which they are bound, form a $C_5-C_{14}$ cycloalkane ring.

Examples of $C_1-C_{12}$ alkyl groups are: methyl, ethyl, n-propyl, n-butyl, sec-butyl, tert-butyl, n-hexyl, n-octyl, 2-ethylhexyl, n-nonyl, n-decyl, n-undecyl, n-dodecyl, etc.

Examples of $C_1-C_{18}$ alkyl groups are, in addition to those listed above: n-tridecyl, n-tetradecyl, n-hexa-decyl, n-octadecyl, etc.

Examples of $C_2-C_6$ alkoxyalkyl groups are: methoxymethyl, ethoxymethyl, propoxymethyl, t-butoxymethyl, ethoxyethyl, ethoxypropyl, n-butoxyethyl, t-butoxy-ethyl, isopropoxyethyl, propoxypropyl, etc.

Examples of $G_{17}$, when it is a $C_3-C_5$ alkenylic group are: 1-propenyl, allyl, methallyl, 2-butenyl, 2-penten-yl, etc.

Examples of $G_{17}$, $T_1$ and $T_2$, when they are a $C_7-C_9$ aralkyl group are: phenethyl, preferably benzyl.

Examples of cycloalkane rings, formed by $T_1$ and $T_2$ when these substituents are considered jointly with the carbon atom to which they are bound, are: cyclopentane, cyclohexane, cyclo-octane, cyclododecane, etc.

Examples of $G_{17}$, when it is a $C_2-C_4$ hydroxyalkyl group, are: 2-hydroxyethyl, 2-hydroxypropyl, 2-hydroxy-butyl, 4-hydroxybutyl, etc.

Examples of $G_{17}$, $T_1$ and $T_2$, when they are a $C_6-C_{10}$ aryl group are: α- or β-naphtyl, optionally substituted with a halogen atom or a $C_1-C_4$ alkyl group, etc.

Examples of $G_{17}$, when it is a $C_2-C_{12}$ alkylene group are: ethylene, propylene, 2,2-dimethylpropylene, tetramethylene, hexamethylene, octamethylene, decamethylene, dodecamethylene, etc.

Examples of $G_{17}$, when it is a $C_4-C_{12}$ alkenylene group are: 2-butenylene, 2-pentenylene, 3-hexenylene, etc.

Examples of $G_{17}$, when it is a $C_6-C_{12}$ arylene group are: o-, m- or p-phenylene, 1,4-naphthylene, 4,4'-diphenylene, etc.

Examples of Z', when it is a $C_2-C_{12}$ alkanoyl group are: propionyl, butyryl, octanoyl, dodecanoyl, preferably acetyl.

Examples of D, when it is a $C_2-C_{10}$ alkylene group, a $C_6-C_{15}$ arylene group or a $C_6-C_{12}$ cycloalkylene group are defined above under point (b).

Specific examples of polyalkylpiperidines having general formula (IX) are:

1) 3-benzyl-1,3,8-triaza-7,7,9,9-tetramethylspiro-[4.5] decane-2,4-dione;

2) 3-n-octyl-1,3,8-triaza-7,7,9,9-tetramethylspiro-[4.5] decane-2,4-dione;

3) 3-allyl-1,3,8-triaza-1,7,7,9,9-pentamethylsniro-[4.5] decane-2,4-dione;

4) 3-glycidyl-1,3,8-triaza-7,7,8,9,9-pentamethyl-spiro [4.5]decane-2,4-dione;

5) 1,3,7,7,8,9,9-heptamethyl-1,3,8-triazaspiro[4.5]- decane-2,4-dione;

6) 2-isopropyl-7,7,9,9-tetramethyl-1-oxa-3,8-diaza-4- oxospiro[4.5]decane;

7) 2,2-dibutyl-7,7,9,9,-tetramethyl-1-oxa-3,8-diaza-4- oxospiro[4.5]decane;

8) 2,2,4,4-tetramethyl-7-oxa-3,20-diaza-21-oxodispiro [5.1.11.2]heneicosane;

9) 2-butyl7,7,9,9-tetramethyl-1-oxa-4,8-diaza-3-oxospiro [4.5]decane; and, preferably, 10) 8-acetyl-3-dodecyl-1,3,8-triaza-7,7,9,9-tetra- methylspiro[4.5]decane-2,4-dione;

or a compound having one of the following formulae:

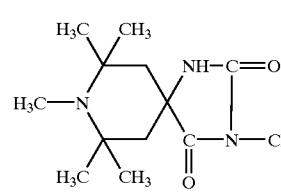 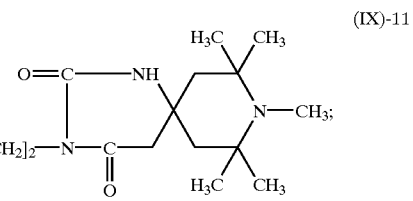

(IX)-11

-continued

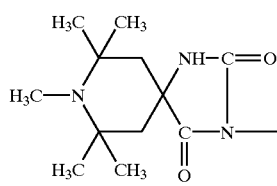
(IX)-12

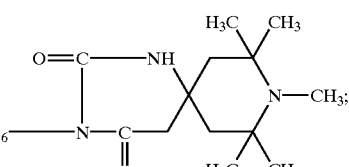
(IX)-13

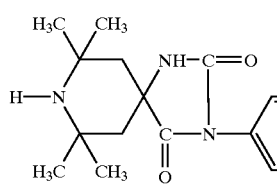
(IX)-14

(e) Compounds having general formula (X):

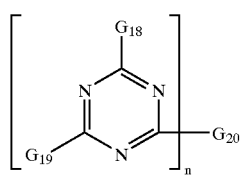
(X)

wherein n is 1 or 2, and $G_{18}$ is a group having one of the following formulae:

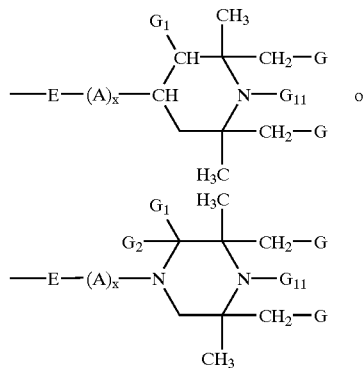

wherein G and $G_{11}$ have the same meanings described under point (a); $G_1$ and $G_2$ are hydrogen, methyl, or together from a substituent=O, E is —O or —$NG_{13}$—; A is a $C_{2-6}$ alkylene group or a —$(CH_2)_3$—O— group; x is 0 or 1; $G_{13}$ is hydrogen, a $C_1$–$C_{12}$ alkyl group, a $C_2$–$C_5$ hydroxyalkyl group, a $C_5$–$C_7$ cycloalkyl group; $G_{19}$ has the same meanings as $G_{18}$ or is one of the following groups: —$NG_{21}G_{22}$, —$OG_{23}$, —$NHCH_2OG_{23}$ or —$N(CH_2OG_{23})_2$; $G_{20}$, when n is 1, has the same meanings as $G_{18}$ or $G_{19}$ and, if n is 2, it is an -E-B-E- group wherein B is a $C_2$–$C_8$ alkylene group optionally interrupted by 1 or 2 —$N(G_{21})$— groups; $G_{21}$ is a $C_1$–$C_{12}$ alkyl group, a cyclohexyl group, a benzyl, a $C_1$–$C_4$ hydroxyalkyl group, or a group having the following general formula:

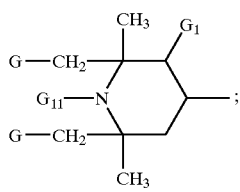

$G_{22}$ is a $C_1$–$C_{12}$ alkyl group, a cyclohexyl group, a benzyl, a $C_1$–$C_4$ hydroxyalkyl group; $G_{23}$ is hydrogen, a $C_1$–$C_{12}$ alkyl group, a phenyl, or $G_{21}$ and $G_{22}$ together are a $C_4$–$C_5$ alkylene or oxyalkylene group , for example:

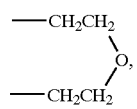

or a group having the formula:

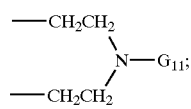

$G_{21}$ is a group having the general formula:

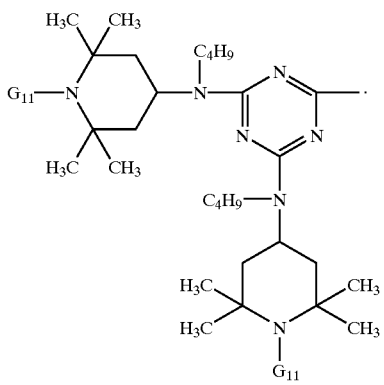

Examples of $C_1$–$C_{12}$ alkyl groups are: methyl, ethyl, n-propyl, n-butyl, sec-butyl, t-butyl, n-hexyl, n-octyl, 2-ethylhexyl, n-nonyl, n-decyl, n-undecyl, n-dodecyl, etc.

Examples of $C_1$–$C_4$ hydroxyalkyl groups are: 2-hydroxyethyl, 2-hydroxypropyl, 3-hydroxypropyl, 2-hydroxybutyl, 4-hydroxybutyl, etc.

Examples of A, when it is a $C_2$–$C_6$ alkylene group are: ethylene, propylene, 2,2-dimethylpropylene, tetramethylene, hexamethylene, etc.

Examples of $G_{21}$ and $G_{22}$, when they jointly form a $C_4$–$C_5$ alkylene or oxyalkylene group, are: tetramethylene, pentamethylene, 3-oxaoentamethylene, etc.

Specific examples of polyalkylpiperidines having general formula (X) are:

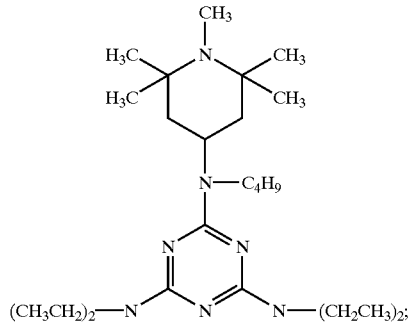

(X)-1

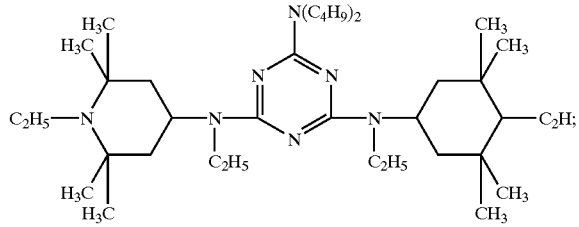

(X)-2

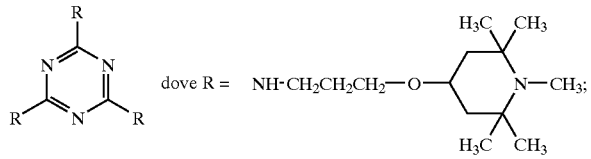

(X)-3

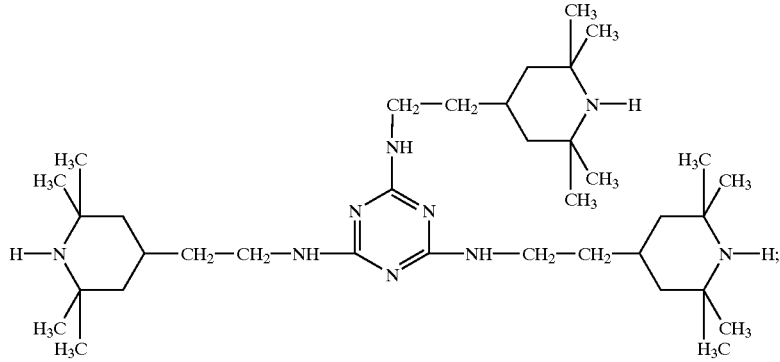

(X)-4

-continued
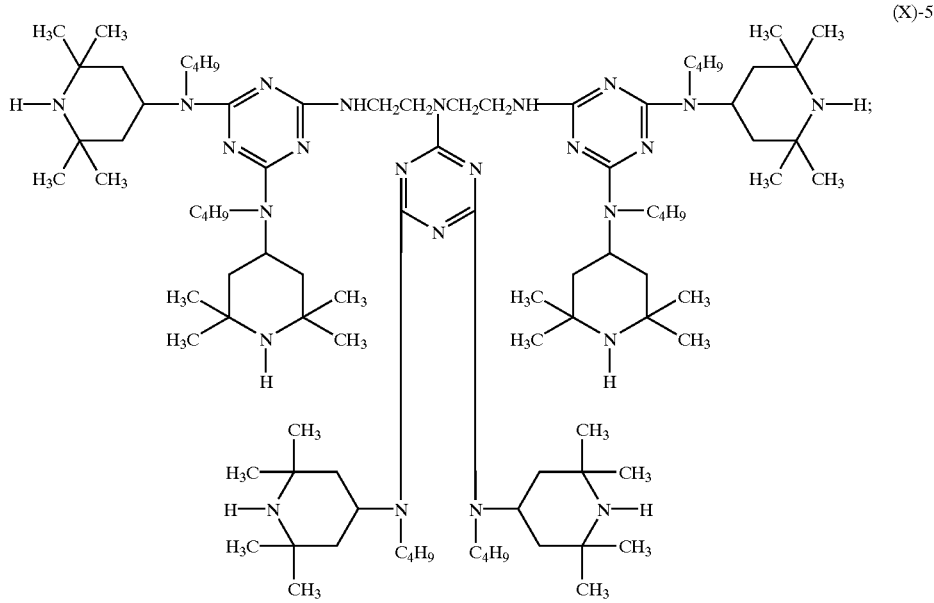
(X)-5
wherein R is:
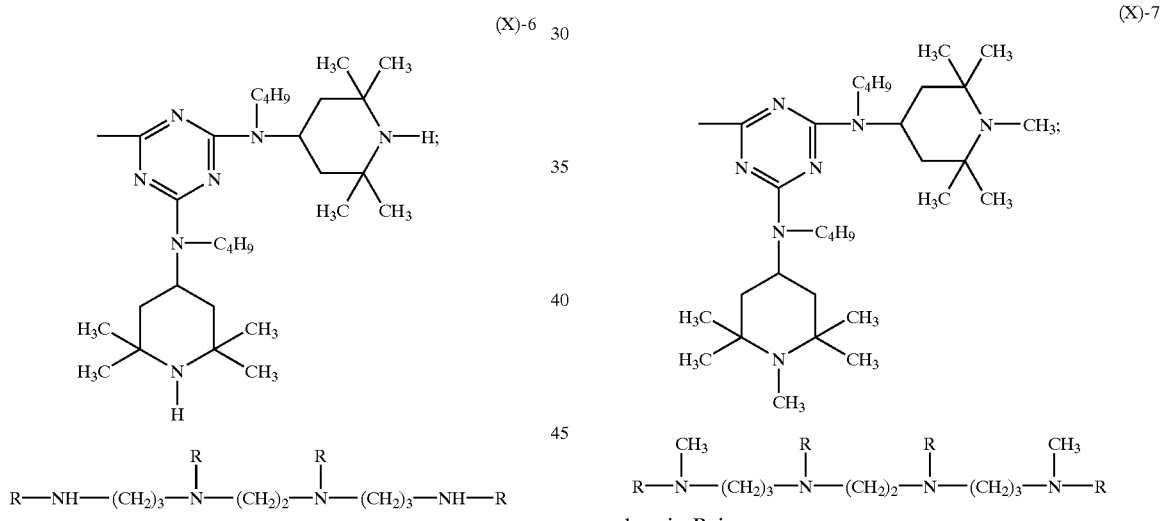
(X)-6
(X)-7
wherein R is:
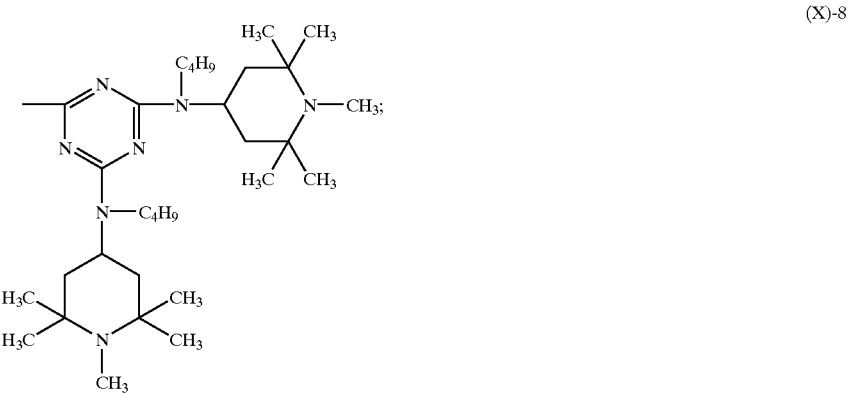
(X)-8

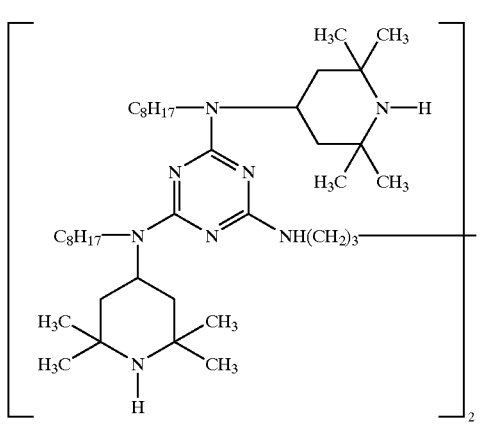

(X)-9

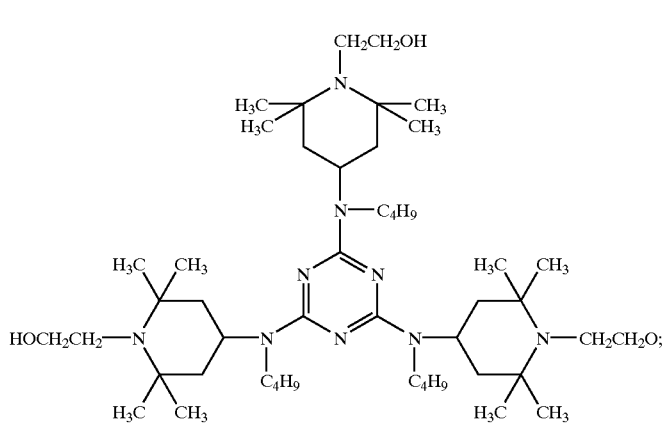

(X)-10

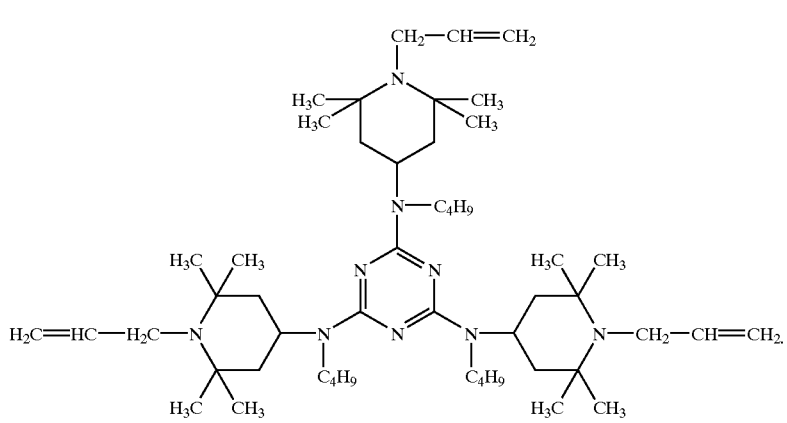

(X)-11

(f) Oligomeric or polymeric compounds whose recurrent structural unit contains a 2,2,6,6-tetramethyl-piperidine radical having general formula (V), in particular polyesters, polyethers, polyamides, polyamines, polyurethanes, polyureas, polyamino-triazines, poly(meth)acrylates, poly (meth)acry-lamides, and their copolymers containing said radical.

Specific examples of the above 2,2,6,6-polyalkyl-piperidines are represented by the following formulae wherein m is a number between 2 and 200:

(XI)-1
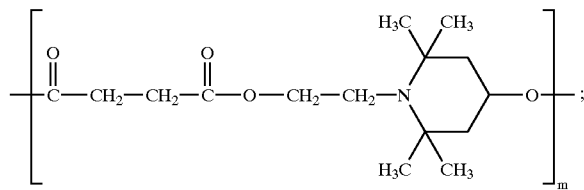
(XI)-2
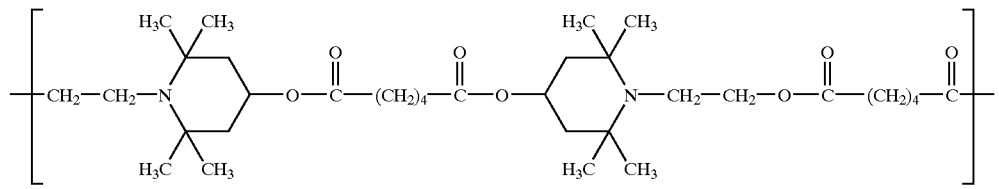
(XI)-3
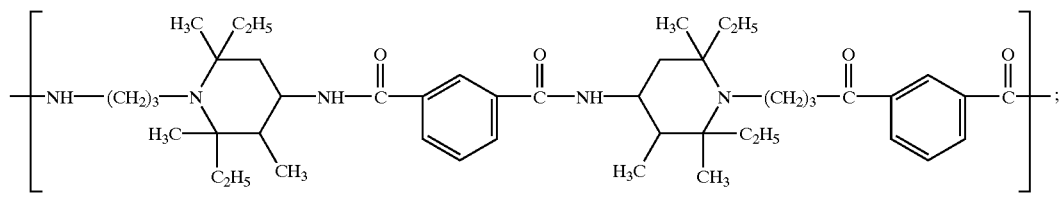
(XI)-4
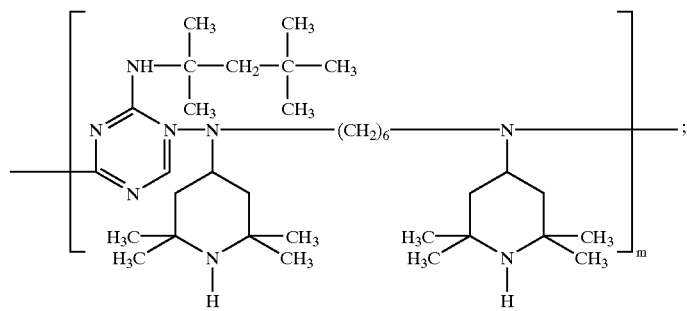
(XI)-5
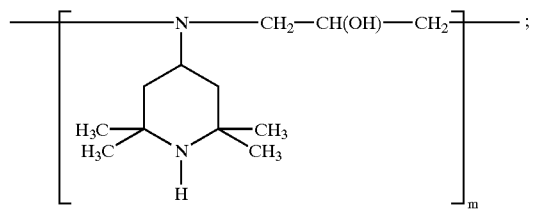
(XI)-6
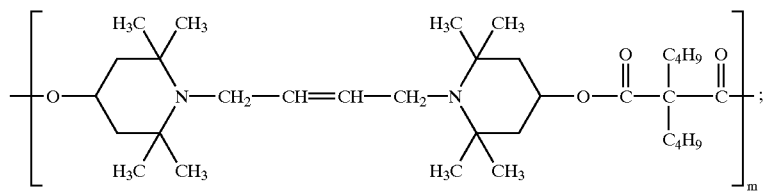

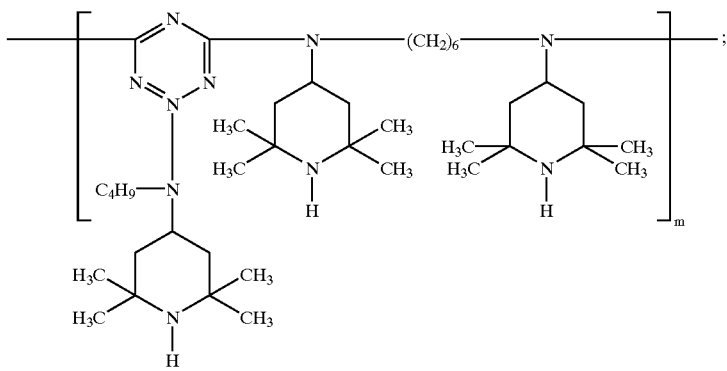
(XI)-7
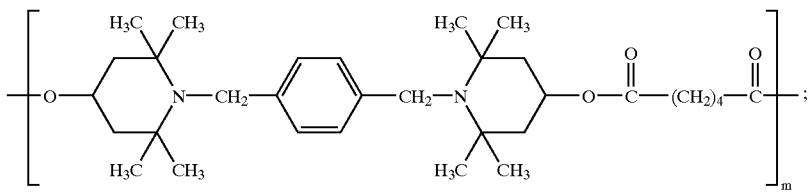
(XI)-8
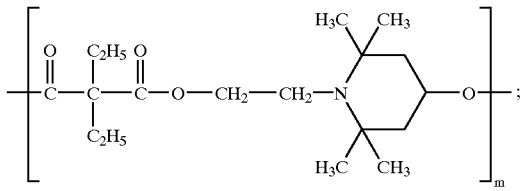
(XI)-9
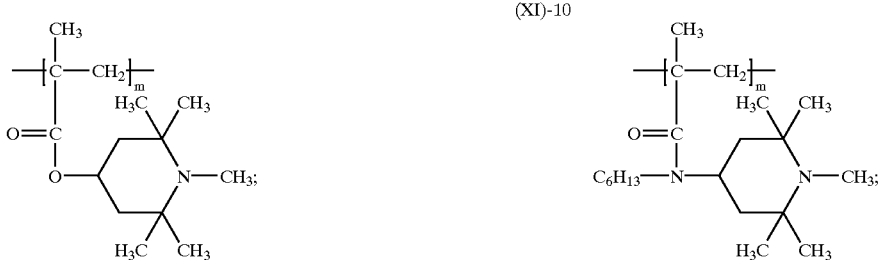
(XI)-10 (XI)-11
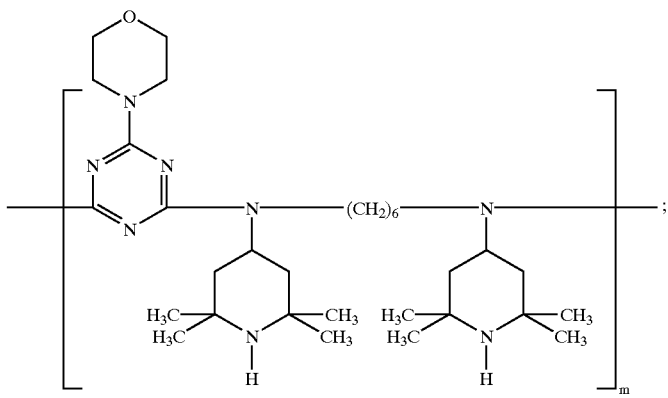
(XI)-12

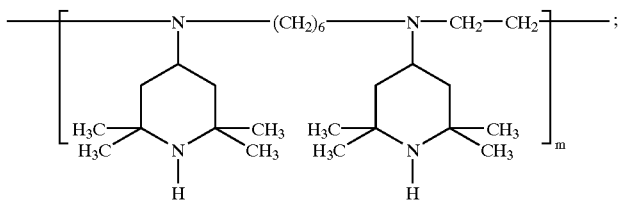 (XI)-13

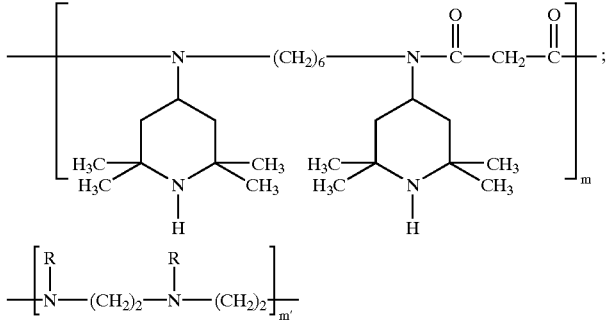 (XI)-14

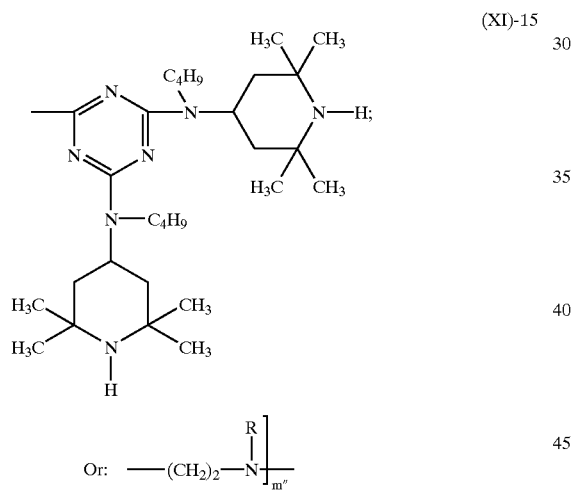

wherein R is:

(XI)-15

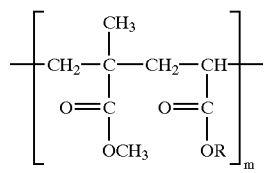

Or: —(CH₂)₂—N[R]ₘ″ wherein m' and m" are an integer between 0 and 200 extremes included, on the condition that m'+m" is m.

Further examples of light stabilizers which can be used for the purpose are:

the reaction products between compounds having formula (XII):

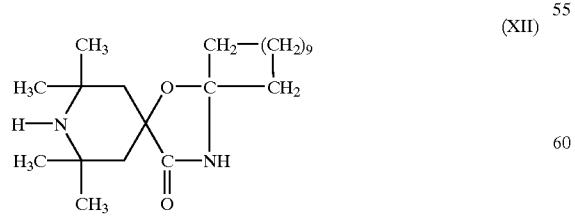 (XII)

and epichlorohydrin;

polyesters obtained by the reaction of butane-1,2,3,4-tetracarboxylic acid with a bifunctional alcohol having formula (XIII):

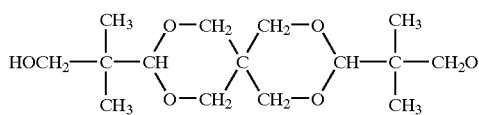 (XIII)

Whose carboxylic termination generated by tetracarboxylic acid has been esterified with a 2,2,-6,6-tetramethyl-4-hydroxypiperidine group;

compounds having general formula (XIV):

(XIV)

$$\left[\begin{array}{c} CH_3 \\ -CH_2-C-CH_2-CH- \\ O=C \quad O=C \\ OCH_3 \quad OR \end{array}\right]_m$$

wherein about a third of the R radicals represent a —C₂H₅ group and the remaining a group having the formula:

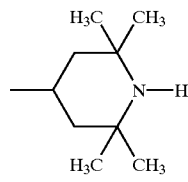

and m is a number between 2 and 200 extremes included;

copolymers whose recurrent unit consists of two units having the formula:

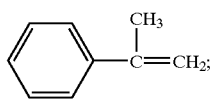

a unit having the formula:

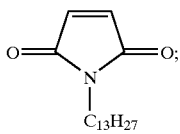

and a unit having the formula:

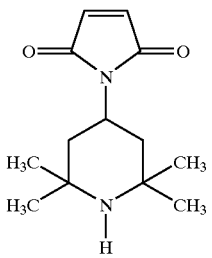

(g) Compounds having general formula (XVIII):

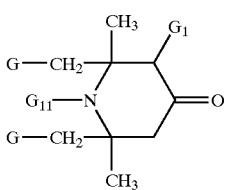

wherein G, $G_1$ and $G_{11}$ have the same meanings described above under point (a). Compounds having general formula (XVIII) wherein G is hydrogen and $G_{11}$ is hydrogen or methyl, are preferably used.

Specific examples of compounds having general formula (XVIII) are:
2,2,6,6-tetramethyl-4-piperidone (triacetoneamine);
1,2,2,6,6-pentamethyl-4-piperidone;
2,3,6-trimethyl-2,6-diethyl-4-piperidone.

(h) Compounds having general formula (XIX):

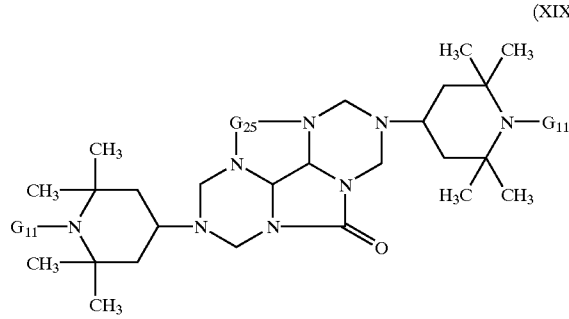

wherein $G_{11}$ has the same meanings described above under point (a) and $G_{25}$ is a direct bond, a methylene or preferably a carbonyl, as described in German patent application DE 3,530,666.

(i) Compounds having general formula (XX):

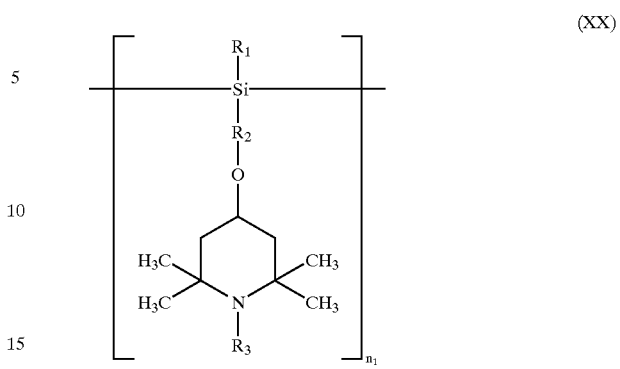

wherein $R_1$ is a $C_1$–$C_{10}$ alkyl group, a $C_5$–$C_{12}$ cyclo-alkyl group optionally substituted with a $C_1$–$C_4$ alkyl group, a phenyl optionally substituted with a $C_1$–$C_{10}$ alkyl group; $R_2$ is a $C_3$–$C_{10}$ alkylene group; $R_3$ is a hydrogen, a $C_1$–$C_8$ alkyl group, O, a —$CH_2CN$ group, a $C_3$–$C_6$ alkenyl group, a $C_7$–$C_9$ phenylalkyl group optionally substituted in the phenyl radical with a $C_1$–$C_4$ alkyl group, a $C_1$–$C_8$ acyl group; and $n_1$ is a number between 1 and 50 extremes included.

Specific examples of compounds having general formula (XX) are:
(1) poly-methylpropyl-3-oxy-[4-(2,2,6,6-tetramethyl)-piperidinyl]siloxane, known under the trade-name of UVASIL 299 of Great Lakes;
(2) poly-methylpropyl-3-oxy-[4-(1,2,2,6,6-pentamethyl)-piperidinyl]siloxane.

The granular formula of the present invention can be combined, as specified above, with other conventional additives or their mixtures. These additives are added in a quantity ranging from about 0.1% to 5% by weight with respect to the weight of the films based on polyolefins or olefinic copolymers to be stabilized, preferably between 0.5% and about 3% by weight.

Examples of other conventional additives which can be used are: antioxidants (such as, for example, alkylated monophenols, alkylthiomethylphenols, hydroquinones and alkylated hydroquinones, tocopherols, hydroxylated thiophenyl ethers, alkylidene-bisphenols, benzyl compounds containing O, N or S, hydroxybenzylated malonates, aromatic hydroxybenzyl compounds, triazine compounds, benzylphosphonates, acylaminophenols, esters of β-(3,5-di-t-butyl-4-hydroxyphenyl)propionic acid with monohydric or polyhydric alcohols, esters of β-(5-t-butyl-4-hydroxyphenyl)propionic acid with monohydric or polyhydric alcohols, esters of β-(3,5-dicyclohexyl-4-hydroxyphenyl)propionic acid with monohydric or polyhydric alcohols, esters of (3,5-di-t-butyl-4-hydroxyphenyl)acetic acid with monohydric or polyhydric alcohols, amides of β-(3,5-di-t-butyl-4-hydroxyphenyl)-propionic acid; other ultraviolet-ray and light stabilizers (such as, for example, derivatives of 2-(2'-hydroxyphenyl) benzotriazoles, esters of benzoic acids, acrylates, oxamides, 2-(2-hydroxyphenyl)-1,3,5-triazine); "metal deactivators"; phosphites and phosphonites; agents capable of destroying peroxides; basic co-stabilizers, nucleating agents; fillers and reinforcing agents; other additives (such as, for example, plasticizers, emulsifying agents, pigments, optical brighteners, flame-retardants, antistatic agents, blowing agents, thiosynergizing agents); benzofuranones and indolinones.

The present invention also relates to a process for the stabilization of agricultural films based on polyolefins or olefinic copolymers, particularly useful for greenhouses, comprising the incorporation of the granular form of the present invention into the poly-olefins or olefinic copolymers subsequently transformed into the above films. Greenhouses covered with the above agricultural films are a further object of the present invention.

Some illustrative but non-limiting examples are provided hereunder for a better understanding of the present invention and for its embodiment.

EXAMPLE 1

50 g of Compound (b), corresponding to 2-hydroxy-4-n-octoxybenzophenone, are charged into a 250 ml flask equipped with a magnetic stirrer and externally heated with an oil bath. The compound is melted (at 50° C.) and subsequently heated to about 100° C.; 100 g of Compound (a), corresponding to [2,2'-thiobis(4-t-butyloctylphenolate)-n-butyl-amine Nickel (II)], are then added gradually.

Compound (a) dissolves in Compound (b) and, on heating to 120° C., a liquid mass is obtained, which is poured onto an aluminum plate cooled to about 0° C.

After about 1 hour, the solidified product is granulated by grinding, obtaining granules of the desired dimensions.

EXAMPLE 2

50 g of Compound (b), corresponding to 2-hydroxy-4-n-octoxybenzophenone, are charged into a 250 ml flask equipped with a magnetic stirrer and externally heated with an oil bath. The compound is melted (at 50° C.) and subsequently heated to about 70° C.; 100 g of Compound (a), correspondingto [2,2'-thiobis(4-t-butyloctylphenolate)-n-butyl-amine Nickel (II)], are then added gradually.

Compound (a) dissolves in Compound (b) and, maintaining a temperature of 70° C., a liquid mass is obtained, which is dripped onto an aluminum plate cooled to about 0° C. After 10–15 minutes, the drops solidify and granules of the desired dimensions are obtained.

What is claimed is:

1. A granular form of a mixture comprising:
   (a) a nickel-auencher corresponding to [2,2'-thiobis (4-t-octyl-phenolate)-n-butylamine Nickel (II)] having formula (I):

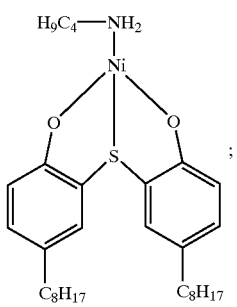

(b) a 2-hydroxy-4-alkyloxybenzophenone corresponding to 2-hydroxy-4-n-octoloxybenzophenone having formula (II):

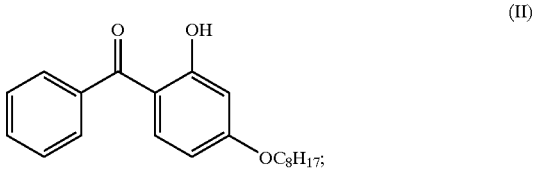

wherein it has two diffraction lines at angles $2\theta=17.593$ and $2\theta=22.023$ in the X-ray diffraction spectrum from powders.

2. The granular form according to claim 1, wherein the nickel-quencher (a) having formula (I) and the benzophenone (b) having formula (II), are used in a ratio ranging from 0.4 to 3.

3. The granular form according to claim 2, wherein the nickel-quencher (a) having formula (I) and the benzophenone (b) having formula (II), are used in a ratio ranging from 1 to 2.

4. A process for the preparation of the granular form according to claim 1, comprising:
   (1) dissolving, under stirring, the nickel-quencher (a) having formula (I) in the benzophen-one (b) having formula (II) which has been previously melted at 50° C.;
   (2) cooling the solution obtained as described under point (1).

5. The process according to claim 4, wherein step (1) is carried out at a temperature ranging from 50° C. to 150° C.

6. Agricultural films based on polyolef ins or olefinic copolymers, containing an effective quantity of the granular form according to claim 1.

7. The agricultural films according to claim 6, wherein metal oxides or hydroxides, salts of earth-alkaline metals, zinc salts and aluminum salts of a $C_1$–$C_{30}$ carboxylic acid, hydrotalcites, and sterically hindered amines, are present.

8. A process for the stabilization of agricultural films based on polyolefins or olefinic copolymers, comprising the incorporation of the granular form according to the claim 1, into the polyolefins or polyolefinic copolymers subsequently transformed into the above films.

9. A greenhouse covered with the agricultural films according to claim 1.

* * * * *